Figure 1:
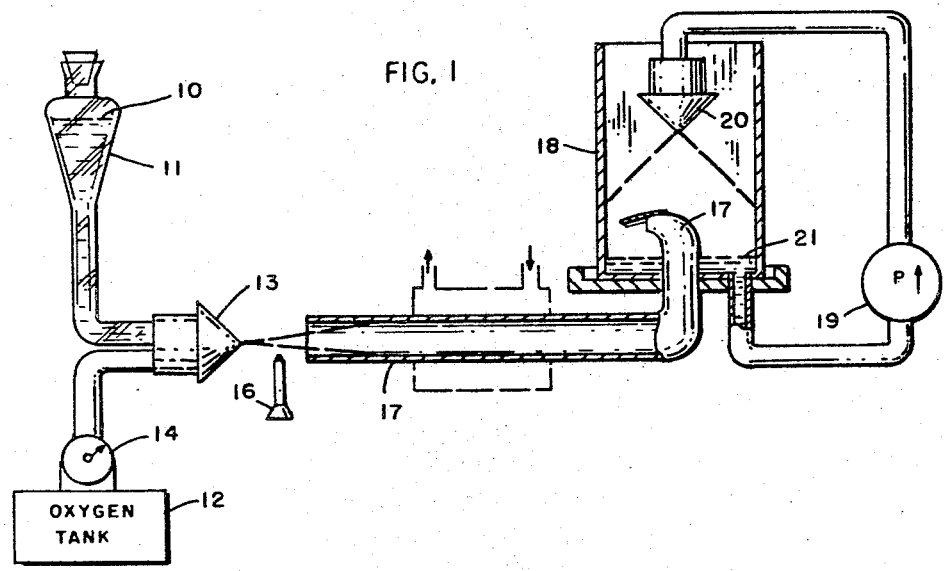

*INVENTOR,*
WALTER W. MALINOFSKY
BY
*Harry M. Saragovitz*
ATTORNEY.

United States Patent Office 3,189,550
Patented June 15, 1965

3,189,550
PROCESS OF MAKING FERRITE MAGNETIC
CORE MATERIAL
Walter W. Malinofsky, Wanamassa, N.J., assignor to the United States of America as represented by the Secretary of the Army
Filed Mar. 7, 1961, Ser. No. 94,086
1 Claim. (Cl. 252—62.5)
(Granted under Title 35, U.S. Code (1952), sec. 266)

The invention described herein may be manufactured and used by or for the Government for governmental purposes, without the payment of any royalty thereon.

The invention relates to a method of making ferrite materials and sintered magnetic cores of ferrite materials and to the ferrite materials and sintered magnetic cores of ferrite materials so prepared; and more particularly, to a method of making nickel ferrite powder and sintered magnetic cores of nickel ferrite powder, and to the nickel ferrite powder and sintered magnetic cores of nickel ferrite powder so prepared.

Ferrite materials are gaining ever increasing importance in the electronics industry. Their use as low conductivity magnetic core materials is well known, but recently their microwave applications have made readily apparent a growing need for new ferrites; each tailor-made for specific device requirements. Briefly, ferrites may be described as compounds of ferric oxide, $Fe_2O_3$, formed with basic metallic oxides having the general formula $MeO \cdot Fe_2O_3$ or $Me^{2+}Fe_2^{3+}O_4$ where Me represents a suitable cation such as iron, manganese, cobalt, nickel, cadmium, magnesium, or zinc, or two or more in mixed crystals. The ferrites may crystallize in the spinel structure, in the ferroxplana structure, in the perovskite structure, in the garnet structure, etc.

Two general methods are known for making ferrite materials; to wit, the dry and wet methods. The dry method involves the intimate mixing of pure oxides or carbonates of the desired metallic constituents and causing the mixture to react at elevated temperatures to form the desired structure. This method requires extensive ball-milling of the oxides or carbonates, usually dispersed in a fluid, until an efficient degree of mixing is obtained. The mixture is then dried, pre-sintered to form the desired structure, reground to attain a suitable particle size distribution for compaction, and finally sintered or re-fired at temperatures above the presintering temperature. This method is undesirable in that it results in ferrite core material of large crystallite or grain size having a high temperature coefficient of permeability or decreased temperature stability. The wet method involves the formation of an intimate mixture of the desired components by co-precipitation from solution. Usually, the components are dissolved as nitrates and co-precipitated as hydroxides, carbonates, and more recently, as the oxalates. The product, after filtration and washing, is carefully dried and ball-milled. The dry precipitate is then prefired, reground, sized and compacted, and finally sintered or refired at temperatures above the presintering temperature. This method also has the disadvantage of resulting in ferrite core material of large crystallite or grain size having a high temperature coefficient of permeability or decreased temperature stability.

An object of this invention is to overcome the aforementioned difficulty in ferrite core material of large crystallite or grain size, to provide increased temperature stability, and high density. Another object of this invention is to prepare a magnetic core of ferrite material having a low temperature coefficient of initial permeability. A further object of the invention is to prepare a magnetic core of ferrite material having a low temperature coefficient of maximum flux density, a low temperature coefficient of remanent flux density and a low temperature coefficient of coercive force. Another object is to prepare a magnetic core of ferrite material with increased linearity of the peak loss and narrow line width up to increased high power levels in the microwave frequency region.

Briefly, the above objectives have been found to be attained by the following method. According to the method, an alcoholic solution of nickel nitrate hydrate and iron nitrate hydrate is propelled by means of oxygen pressure as measured at the oxygen source of at least 12 to 15 pounds per square inch through a fine nozzle at a rate of flow of about 30 milliliters per minute. The material is then ignited and the resulting nickel ferrite powder collected in a water tower. Then, the powder is densified by the simultaneous application of heat and pressure to the powder.

Very important to the method is that the nickel ferrite powder be below about 0.2 micron in average crystallite size prior to densifying the powder and that densification be carried out within a short time at a relatively low temperature to prevent excessive crystal growth and yet provide sintering and densifying effects. Since rapid crystal growth and sintering normally go hand-in-hand, present conventional processes cannot meet this requirement as to crystallite size. Densified nickel ferrite powder as referred to above is nickel ferrite powder in which single phase nickel ferrite ($NiFe_2O_4$) crystals have been brought into intimate contact with one another and where the air gaps, holes, or pores naturally occurring between the crystals of non-densified single phase nickel ferrite powder have been removed. The term single phase nickel ferrite powder refers to nickel ferrite powder wherein the crystals are of the formula ($NiFe_2O_4$) and where no crystals of any other formula are present.

Figure 2:
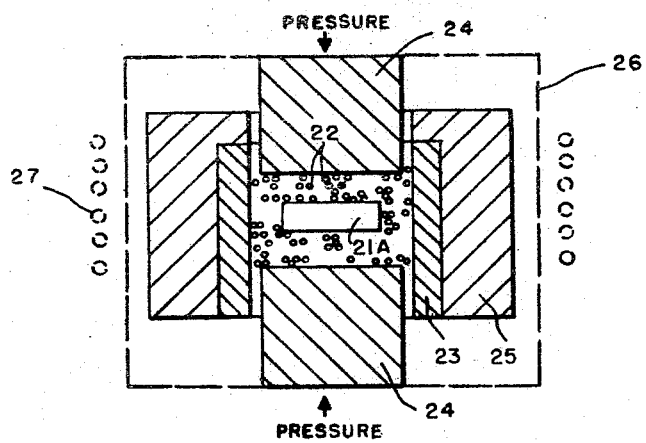

The invention can be best understood by referring to the drawing. In the drawing, FIG. 1 is a schematic view of apparatus used to obtain single-phase spinel structure nickel ferrite powder of 0.02 micron average diameter in size. FIG. 2 is a schematic view of apparatus used for densifying the nickel ferrite powder.

Referring to FIG. 1, a 30% by weight solution of nickel nitrate hydrate and iron nitrate hydrate is prepared using methyl alcohol as the solvent. The proportions are determined by the final composition desired, that is, $NiFe_2O_4$. This solution 10 is placed in the solution reservoir 11 and the solution 10 propelled by means of oxygen pressure supplied by an oxygen tank 12 through a fine spray nozzle 13. In order to prevent the formation of second phases, a pressure regulator 14 is used to keep the oxygen pressure at the tank above a critical value. This value, indicated by the pressure regulator 14 lies between 12 to 15 pounds per square inch. When obtaining single phase nickel ferrite ($NiFe_2O_4$), an oxygen pressure of 20 pounds per square inch has been found very suitable. Below the critical pressure, nickel-iron alloy, and for some compositions, FeO are also formed. The rate of flow of the solution 10 through the spray nozzle 13 is about 30 milliliters per minute. After the solution has left the spray nozzle 13 in the form of a fine mist, it is ignited by a bunsen burner 16, then cooled in the cooling jacket or pipe 17 and then collected in the water tower 18. Water in the water tower 18 is kept recirculating by means of the pump 19 and the water propelled as a fine spray through the water nozzle 20 against the sides of the tower 18. Single phase nickel ferrite powder 21, of 0.02 micron average diameter in size, is collected at the bottom of the water tower.

The stoichiometric amounts of iron or nickel in the alcoholic solutions above can be varied within limits. In the case of 100% excess iron or nickel, second phases of FeO or NiO, respectively, will be formed with a consequent deleterious effect on the magnetic properties. An excess of 20 to 50% of nickel can be tolerated, however, with no second phase forming (as determined by X-ray diffraction techniques), provided the limitation as to oxygen pressure, as described above, is observed. The opening of the fine spray nozzle 13 through which the solution 10 is propelled is about 25 to 30 mils in diameter. Though a 30% by weight solution of nickel nitrate hydrate and iron nitrate hydrate is shown in the example, lower concentrations can be used. Of course, if lower concentrations are used, the method becomes more expensive as additional alcohol solvent is then necessary.

The nickel ferrite powder 21 is then prepelletized in a steel die at about 20,000 pounds per square inch and at room temperature.

Referring next to FIG. 2 of the drawing, the prepelletized nickel ferrite powder 21A is surrounded by zirconium oxide ($ZrO_2$) powder 22 which is in turn enclosed by zirconium oxide cylinders 23 and zirconium oxide rods 24. The zirconium oxide cylinders 23 are surrounded by steel cylindrical dies 25 and the whole assembly surrounded by insulating brick 26. An induction heater coil 27 supplies heat to the assembly. The prepelletized nickel ferrite powder 21A must be densified without greatly increasing the crystallite size. An increase to about 0.1 micron (as determined by line-broadening of X-ray diffraction lines) is optimum and in no case should the increase be above about 0.2 micron. A pressure of 6,000 pounds per square inch and a temperature of about 2050° F. are then simultaneously applied to the prepelletized nickel ferrite powder 21A for approximately 25 minutes. This treatment results in a densified, sintered-looking magnetic material composed of single-phase nickel ferrite, the densification being about 98% of the theoretical (X-ray) density. The processing time may be varied, but for times less than about 15 minutes, the density, strength, and initial permeability fall off rapidly; while for times of 60 minutes or more, the increases in density and initial permeability are marginal. Variations in time between these approximate limits will also shift the Q-peak of a toroidal nickel ferrite core made from the densified nickel ferrite powder, and as measured in a copper coil, toward higher frequencies for shorter times and toward lower frequencies for longer times. This is similarly true for the initial permeability $\mu_0$. The temperature may also be varied, having a qualitatively similar effect as varying the time.

The magnetic properties, including the temperature stability, of a nickel ferrite core processed under the above conditions and as measured in a copper coil where the lead inductance has been cancelled out are set forth below. In the listing of the properties, $\mu_0$ is the initial permeability, Q is the quality factor, $\mu_0 Q$ the merit factor, and T.C. the temperature coefficient.

$\mu_0$ (at 25° C.) _____ 16
Q (at 25° C.) _____ 94
$\mu_0 Q$ (at 25° C.) _____ 1500

Maximum change in $\mu_0$ (20° C. to 520° C.)—circa 6%.

T.C. (average)                    Parts per million/° C.
  20° C. to 520° C. _____ 120
  25° C. to 100° C. _____ 270
  −50° C. to 20° C. _____ 340

The increased temperature stability attained by this method is evident from a comparison of properties with temperature data for a conventionally-prepared nickel ferrite $NiFe_2O_4$ shown in the literature ("Ferrites," by J. Smit and H. P. J. Wijn, at page 251). The latter has the following properties:

$\mu_0$ (at 25° C.) _____ 17
Maximum change in $\mu_0$ (20° C. to 520° C.)
                                    percent__ 62
T.C. (average)
  20° C. to 520° C. _____ parts per million/° C__ 1240
  25° C. to 100° C. _____ do____ 693

The hysteresis loop properties of the nickel ferrite core produced by the method of this invention as measured at room temperature are set forth below. In the listing, $B_{max}$ is the maximum flux density for an applied field of 147 oersteds; $B_{rem}$, the remanent flux density for an applied field of 147 oersteds; and $H_c$, the coercive force.

$B_{max}$ _____ gausses__ 2350
$B_{rem}$ _____ do____ 1250
$H_c$ _____ oersteds__ 21

An improved temperature stability is attained in the hysteresis loop properties of the nickel ferrite core produced by the new method as compared with the same properties of the conventionally-prepared nickel ferrite in the temperature range of −25° C. to 75° C. This is indicated by the following table:

|  | Conventional | New Method |
|---|---|---|
| Relative change in $B_{max}$ (in percent) | 5.1 | 3.5 |
| Relative change in $B_{rem}$ (in percent) | 10.9 | 7.8 |
| Relative change in $H_c$ (in percent) | 21.7 | 7.3 |

There is also indication that the densified nickel ferrite of this invention gives a strong return rise in $\chi''/\chi_0''$ at high power ($H^2_{R.F.}$) as contrasted to the usual decrease in $\chi''/\chi_0''$ with increasing power level as measured at microwave frequencies. ($H_{R.F.}$ above represents the magnetic field in oersteds. The power is directly proportional to $H^2_{R.F.}$. $\chi_0''$ above represents the peak loss susceptibility at resonance for low power; $\chi''$ is the peak loss susceptibility at increased powers; and $\chi''/\chi_0''$ is the ratio of the two, or the loss normalized to that at low power.) In general, it is desired for isolators that the loss ratio stay as near to one as possible, out to as high a power level as possible. That the densified nickel ferrite prepared by this invention possesses advantages in this respect over conventionally-prepared nickel ferrite can be seen from the following table. Measurements disclosed in the table are made at X-band by the cavity technique on the densified nickel ferrite of this invention with zinc substitution (Ni:Zn=1:2) designated B in the table and on conventionally-prepared nickel ferrite having the same zinc substitution and designated A in the table. Pure nickel ferrite (no zinc added) and other ferrite compositions also give indications of an analogous rise in $\chi''/\chi_0''$ at high power, but to varying degrees.

| $H^2_{R.F.}$ | $\chi''/\chi_0''$ | |
|---|---|---|
| (Oersteds) | A | B |
| 1 | .99 | .99 |
| 100 | .67 | .67 |
| 400 | .60 | .62 |
| 1,600 | .55 | .64 |
| 2,500 | .53 | .76 |
| 10,000 | .52 | .80 |

The loss ratio exhibited by the densified nickel ferrite of this invention suggests its adaptability for use in microwave devices such as resonance isolators which could operate at much higher power than normal with a greater degree of isolation maintained. These devices might then be used in missiles and satellites. The increased temperature stability and permeability of magnetic cores of the densified nickel ferrite of this invention suggests the use of the cores in intermediate frequency and radio frequency transformers, chokes, and as inductors in tuned circuits. Telemetering applications in missiles, satellites, and high power transformers are seen for the cores due to their hysteresis properties. Due to their microwave properties, use for the cores is seen in isolators, circulators, rotators, and phase shifters where a reduction in the low field losses is desirable as, for example, in the C and S bands. Magnetic measurements made on the densified nickel ferrite of the invention also indicate a faster switching time for use in magnetic memory cores in computers.

The invention should not be construed as limited to the nickel ferrite herein described and to its method of preparation but should be considered as applicable to other ferrite classes with minor modifications in the method of preparation.

While there has been described what is at present considered a preferred embodiment of this invention, it will be obvious to those skilled in the art that various changes and modifications may be made therein without limiting the scope of the invention as hereinafter claimed.

What is claimed is:

The method of making a magnetic core material of densified nickel ferrite powder of 0.1 micron average diameter in size including the steps of (1) propelling an alcoholic solution of nickel nitrate hydrate and iron nitrate hydrate by means of oxygen pressure of at least 12 to 15 pounds per square inch through a fine nozzle at a rate of flow of about 30 milliliters per minute, (2) igniting the solution, (3) collecting the resulting nickel ferrite powder in a water tower, (4) prepelletizing the powder, and (5) simultaneously applying heat and pressure of about 2050° F. and 6,000 pounds per square inch respectively to the power for approximately 25 minutes.

References Cited by the Examiner
UNITED STATES PATENTS

| | | | |
|---|---|---|---|
| 1,997,193 | 4/35 | Kato et al. | 252—62.5 |
| 2,935,411 | 5/60 | Robinson | 252—62.5 |

FOREIGN PATENTS

| | | |
|---|---|---|
| 1,089,564 | 10/54 | France. |
| 644,639 | 10/50 | Great Britain. |
| 697,059 | 9/53 | Great Britain. |

OTHER REFERENCES

Economos, J. American Ceramic Soc., July 1955, Magnetic Ceramics, etc., pp. 241–244.

MAURICE A. BRINDISI, *Primary Examiner.*

JULIUS GREENWALD, *Examiner.*